Oct. 29, 1974  A. F. SHAW  3,845,186
DISSIPATION OF ELECTROSTATIC CHARGES FROM INSULATING MATERIALS
Original Filed Nov. 25, 1970
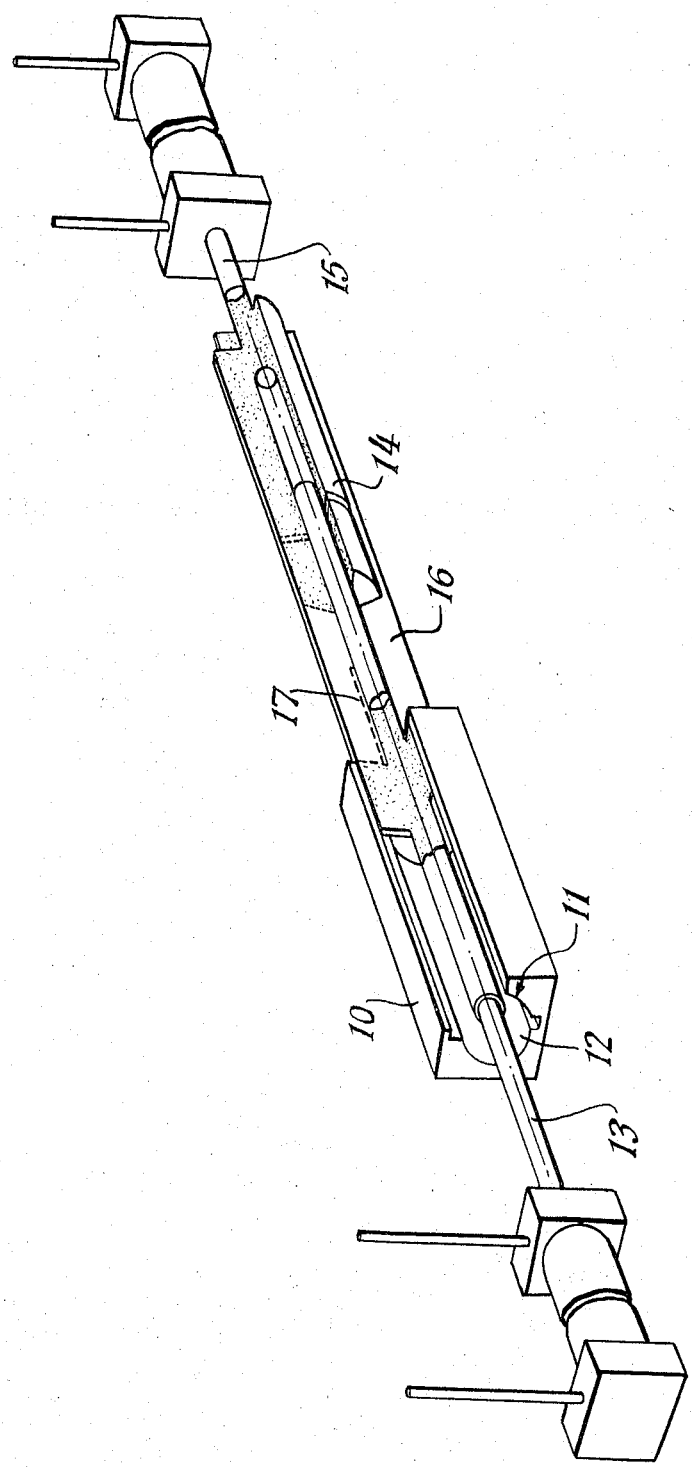
INVENTOR
ALLEN FREDERICK SHAW
BY
ATTORNEY

United States Patent Office 3,845,186
Patented Oct. 29, 1974

3,845,186
DISSIPATION OF ELECTROSTATIC CHARGES FROM INSULATING MATERIALS
Allen Frederick Shaw, near Reading, Berkshire, England, assignor to Superflexit Limited, Buckinghamshire, England
Continuation of application Ser. No. 92,780, Nov. 25, 1970. This application June 23, 1972, Ser. No. 265,480
Int. Cl. B29f 3/00
U.S. Cl. 264—104                                    1 Claim

ABSTRACT OF THE DISCLOSURE

The present invention relates to means for dissipating an electrostatic charge from a tube formed of an insulating material by forming a strip of conducting material within the tube by extruding a preform of the plastics material having a conductive insert and sintering the extrusion at an elevated temperature.

---

This is a continuation of application Ser. No. 92,780, filed Nov. 25, 1970 now abandoned.

The present invention relates to a method of providing a means of dissipating an electrostatic charge from an insulating material and in one aspect of the invention provides means for dispersing or dissipating electrostatic charge from a conduit or tube of an insulating material.

Polytetrafluoroethylene, commonly known as P.T.F.E. and hereinafter so referred to is extensively used in tube form for fuel lines and fuel hose lines and particularly in aircraft engine installations and the like where extreme conditions of temperature and pressure are encountered during the engine operation and where a high degree of satisfactory performance and useful life is essential. Where such reliable performance characteristics are required, the tubing is previously subjected to rigid inspection procedures and must meet certain specifications and tests before acceptance for installation. The same is true of other insulating materials which can be used in a tube or conduit for the passage of liquid therethrough. In the case of P.T.F.E. tubing, the tube is conventionally covered with an armoured sheath in the form of a flexible braid covering. Although rigidly inspected and tested equipment has given satisfactory performance, it has been noted that over a long period of time premature failure or undue leakages have frequently occurred. During passage of fuel or liquid through P.T.F.E. tubes and tubes formed of other plastics insulating material, an electrostatic charge builds up in the lines. In view of the nature of the operating conditions, this electrostatic charge has not, as would be expected, been dissipated from the interior of the tube to the end fittings. Rather it has appeared in certain failures that static electricity has been discharged by arcing through the walls of the P.T.F.E. tube to the earth by way of the metal of the wire braid covering. This arcing results in the formation of a minute pin-hole in the wall structure and thus causes leakage of the fuel or other liquid passing through the tube.

Considerable problems have arisen in the grounding of electrostatic charges which build up in conduits and containers in which liquids or gases are circulated and in some circumstances these charges can give rise to dangerous or metastable conditions.

According to the present invention there is provided a method for providing means for dissipating an electrostatic charge from an extrusion of an insulating plastics material which method comprises forming a preform of the said insulating plastics material having an axial insert of conductive material comprising a conductor of fine particle size and a matrix of plastics material the same as or compatible with the said material, extruding the preform so formed to provide an extrusion having a longitudinal strip of conductive material in the surface thereof and sintering the extrusion at an elevated temperature.

In one aspect of the present invention, the preform is preferably formed in two parts at least one of which contains an insert of conductive material therein and the two parts of the preform are thereafter inserted in the extruder for extrusion in the normal way.

The present invention also provides a conduit, tube or container formed by extrusion from an insulating material having in an inner surface thereof a longitudinal strip of conductive or substantially conductive material the arrangement being such that the strip serves to dissipate an electrostatic charge which may build up in said tube or container during use. A multiplicity of strips may be employed within said tube or container to dissipate said electrostatic charge.

The plastics material may be polytetrafluoroethylene (P.T.F.E.) and the extrusion may be a tube formed in accordance with the process of the present invention and having at least one strip incorporated on an inner surface thereof.

The conductive material from which the conducting strip is formed may comprise a dispersion of carbon black of fine particle size within a matrix of the polymer of the tube. In this way on sintering of the material the conducting strip becomes integral with and forms part of the tube itself. The matrix may be of the same material as the tube, i.e. polyethylene, polypropylene, polytetrafluoroethylene and the like, and may contain up to from 3 to 25% by weight of a conductive material typically carbon black or iron oxide ($Fe_3O_4$). Any finely ground conductor may be employed in the conductive material or strip and in the case of carbon black this should be ground to a particle size of between 0.5 and 20 mil. micron. The maximum amount of conductive material incorporated within the matrix is that amount which can be incorporated in the matrix material to permit the resulting mixture to retain its generally plastics properties in that it is capable of being extruded and subsequently sintered to form part of the extruded article itself.

The conductive material, as employed during the formation of the preform, contains a proportion of a lubricant or solvent typically white spirit or naphtha in a quantity of 80 to 120% by weight on the weight of the plastics material constituting the matrix of the conductive material. The lubricant selected is preferably the same as the lubricant incorporated in the insulating material during the extrusion process.

The preform is formed in a mold which is separated into two compartments by means of a pair of diametrically disposed separation plates carried by a central cylindrical plunger. One side of the cylindrical plunger is provided with a semi-circular brass sleeve approximately 1/10" thick. The material is applied to the mold on either side of the plunger and separator plate in approximately equal quantities and it is, thereafter, pressed at a pressure within the range of 140 to 190 lbs. per square inch, to mold two preform elements. The preform elements are then removed from the mold and the first preform corresponding with the semi-circular brass sleeve about the central plunger is provided with a layer of approximately $\frac{1}{10}''$ thick of the conductive material formed in the method described above. The conductive material is pressed into place using the same brass sleeve at hand pressure i.e. of the order of 10 to 20 lbs. per square inch. The two halves of the preform are inserted about the central pin of an extruder and the extrusion is carried out in a conventional manner using a typical reduction ratio of 300:1 to 400:1.

Following is a description by way of example only and with reference to the accompanying drawing of one method of carrying the invention into effect.

In the drawing there is shown a perspective view partially in cut away of a mold for forming the preform in accordance with the present invention.

An insulating mix for extruding a polytetrafluoroethylene tube was made up of the following parts by weight:

|  | Parts |
|---|---|
| P.T.F.E. paste polymer | 100 |
| White spirit | 20 |
| Pigment cadmium red | 0.5 |

The paste polymer, white spirit and pigment were thoroughly and uniformly mixed and thereafter the mixture was employed in the formation of a preform.

The preform is a two part preform and is formed in a mold 10 comprising a hollow body 11 having a cylindrical bore 12 accommodating central plunger 13 and pressure portion 14 disposed within said body. The pressure portion closes one end of the cylindrical bore 12. The pressure portion is carried by a cylindrical plunger 15 disposed co-axial within said cylindrical bore 12 and is adapted to be axially slidable together with said pressure portion within the body in an axial direction to reject molded preforms from the mold. The plunger is provided with a pair of diametrically disposed wings 16 which extend longitudinally of the cylindrical bore from the pressure portion towards the other end thereof thereby forming a two compartment mold. A semi-circular brass sleeve $17\frac{1}{10}''$ thick is placed about the central plunger between the wings constituting the mold partition to provide a spacing for a subsequent insert of conductive material in one only of the two halves of the preform.

The mixture prepared in the manner described above is thereafter inserted in equal quantities in each compartment, typically 310 grams of material being supplied to each side. The material is then pressed into a preform by applying pressure from the top of the mold by means of a suitable plunger at a pressure of 150 lbs. per square inch. The pressure is released and the split preform section is driven out of the mold by raising the plunger and the base plate upwardly of the cylindrical sleeve, the two halves of the preform thereafter being separated from the wings, plunger and base plate to provide first and second preform portions, the former having been formed in the portion of the mold incorporating the semi-circular brass sleeve. The second portion is inserted in polymer and the first preform portion is coated within the space defined by the insert the $\frac{1}{10}''$ thick layer of a conductive mix.

The conductive mix is formed of the following parts by weight:

|  | Parts |
|---|---|
| P.T.F.E. paste polymer | 100 |
| White spirit | 100 |
| Carbon black ground to 0.5 micron | 6 |

The material is coated into the recess at a thickness of approximately $\frac{1}{10}''$ by hand and is thereafter pressed into place using a semi-circular brass sleeve. The pressure exerted as 10 to 20 lbs. per square inch. After insertion of the conductive mix the first preform portion is inserted into the extruder over the central pin together with the second preform portion and is extruded in the usual way using a reduction ratio of between 300:1 and 400:1.

The extrudate was in the form of a tube having a $\frac{1}{4}''$ internal diameter and a wall thickness of $0.025''$. The following table illustrates the resistance properties against test result voltage for each sample produced by the above method, the resistance is given as a specific volume resistance per 0.001 inch:

| Sample number | Length | Resistance | Test voltage, kv. |
|---|---|---|---|
| 1 (control) | No conductivity measurement recorded |  |  |
| 2 | 8'6'' | $2.9 \times 10^7$ | 10 |
| 3 | 15'3'' | $1 \times 10^6$ | (1) |
| 4 | 4'6'' | $4 \times 10^7$ | 8 |
| 5 | 15'9'' | $2.8 \times 10^7$ | 7 |
| 6 | 15'6'' | $2.8 \times 10^6$ | 5 |
| 7 | 15'3'' | $2.6 \times 10^5$ | 5 |
| 8 | 12'0'' | $1 \times 10^5$ | 2 |
| 9 | 4'9'' | $3.5 \times 10^7$ | 7 |

[1] 500 volts.

NOTE.—Sample 1 (control) was made without a conductive strip.

These resistances were low enough to dissipate an electrostatic charge built up in the tube.

In practice in the process of the invention two preforms were inserted in the press for extrusion through the die and they were arranged so that the strips in each preform were aligned with the strips in the other. The tube so formed was thereafter cut at the joint and the tube was dried for 24 hours to remove the lubricant at room temperature. Thereafter, the tubes were sintered at a temperature of 720° F. for 4 hours.

In an alternative embodiment of the invention it will be appreciated that in a continuous extrusion process, the tube can be passed through a drying oven at a temperature of 320° F. to remove the lubricant and thereafter passed through a sintering oven at an elevated temperature of 800° F.

I claim:

1. A method of manufacturing an electrically conductive plastic tube comprising the steps of:
   molding a pair of preform tube halves from an extrudable, sinterable plastic material incorporating a volatile lubricant, each preform being a relatively thick walled semi-cylindrical member having a longitudinal semi-cylindrical bore, the bore of one of said preforms having a larger radius than the other, applying a conductive coating comprising extrudable, sinterable plastic material incorporating from 3 to 25% by weight conductive filler and volatile lubricant within the bore of larger radius to such a thickness as to reduce the bore to the same size as the bore of the other preform, placing the two preforms in face to face relation to define a cylinder and extruding the same through a die to form a tube, driving off said lubricant, and thereafter subjecting said tube to elevated temperatures to effect sintering of said tube.

References Cited
UNITED STATES PATENTS

| | | | |
|---|---|---|---|
| 2,414,793 | 1/1947 | Becker et al. | 264—104 |
| 3,354,243 | 11/1967 | Dodge | 264—25 |
| 3,442,715 | 5/1969 | Yee et al. | 264—104 |
| 2,945,265 | 7/1960 | Sell et al. | 264—176 R |
| 3,473,087 | 10/1969 | Slade | 138—103 XR |
| 3,070,132 | 12/1962 | Sheridan | 138—103 XR |
| 3,230,288 | 1/1966 | Henderson | 264—176 R |
| 3,152,082 | 10/1964 | Davis et al. | 264—127 XR |

(Other references on following page)

FOREIGN PATENTS

| | | | |
|---|---|---|---|
| 831,754 | 3/1960 | Great Britain | 264—323 |
| 735,162 | 8/1955 | Great Britain | 264—126 |

OTHER REFERENCES

Remy et al., Treatise on Inorganic Chemistry, Elsevier, N.Y. (1956), p. 262 relied on.

Remy, H., Treatise on Inorganic Chemistry, Elsevier, N.Y. (1956), pp. 253 and 289 relied on.

Randolph et al., Plastics Engineering Handbook, Reinhold, N.Y. (1960), p. 501 relied on.

ROBERT F. WHITE, Primary Examiner

W. E. HOAG, Assistant Examiner

U.S. Cl. X.R.

264—112, 126, 134, 135, 262, 263; 317—2 J; 174—47, 68 C